(12) United States Patent
Kurashige (10) Patent No.: US 9,766,471 B2
(45) Date of Patent: Sep. 19, 2017

(54) STEREOSCOPIC IMAGE DISPLAY APPARATUS (71) Applicant: DAI NIPPON PRINTING CO., LTD., Tokyo (JP)

(72) Inventor: Makio Kurashige, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 119 days.

(21) Appl. No.: 14/764,289

(22) PCT Filed: Jan. 29, 2014

(86) PCT No.: PCT/JP2014/051988
§ 371 (c)(1),
(2) Date: Jul. 29, 2015

(87) PCT Pub. No.: WO2014/119622
PCT Pub. Date: Aug. 7, 2014

(65) Prior Publication Data
US 2015/0370081 A1 Dec. 24, 2015

(30) Foreign Application Priority Data

Jan. 30, 2013 (JP) .................................. 2013-015832

(51) Int. Cl.
*G02B 5/32* (2006.01)
*G02B 27/22* (2006.01)
(Continued)

(52) U.S. Cl.
CPC ........... *G02B 27/2214* (2013.01); *G02B 5/32* (2013.01); *G02B 27/225* (2013.01); *G02B 27/48* (2013.01);
(Continued)

(58) Field of Classification Search
CPC .. G02B 27/2214; G02B 27/225; G02B 27/48; G02B 5/32; G02B 27/22; H04N 9/3129;
(Continued)

(56) References Cited

U.S. PATENT DOCUMENTS 5,392,140 A * 2/1995 Ezra .................... G02B 27/2214
348/E13.029
6,229,561 B1 5/2001 Son et al.
(Continued)

FOREIGN PATENT DOCUMENTS

JP 10-111475 AI 4/1998
JP 2012-083538 A1 4/2002
(Continued)

OTHER PUBLICATIONS

Masahiro Kawakita, et al., "Three-Dimensional Image System without Special Glasses," Quarterly Report of the National Institute of Information and Communications Technology, vol. 56, Nos. 1/2, 2010, pp. 43-52 (with English translation).
(Continued)

*Primary Examiner* — Bumsuk Won
*Assistant Examiner* — Collin X Beatty
(74) *Attorney, Agent, or Firm* — Burr & Brown, PLLC (57) ABSTRACT

A stereoscopic image display apparatus including: an optical device having an n (n≥2) number of regions provided corresponding to the n number of parallax images, respectively, each region being capable of diffusing a coherent light beam; an irradiation unit to irradiate the optical device with a coherent light beam to scan the n number of the regions; a spatial light modulator that is illuminated with a coherent light beam incident on each of positions of the optical device and then diffused, to generate a modulated image corresponding to each of the n number of regions, in sync with the scanning of the n number of regions with the
(Continued)

coherent light beam; and a projection optical system to project the n number of parallax images generated by the modulated image onto one plane to superimpose the parallax images on one another on the one plane at different angles.

13 Claims, 9 Drawing Sheets

(51) Int. Cl.
*G02B 27/48* (2006.01)
*G03B 35/18* (2006.01)
*H04N 9/31* (2006.01)
*H04N 13/04* (2006.01)

(52) U.S. Cl.
CPC ........... *G03B 35/18* (2013.01); *H04N 9/3129* (2013.01); *H04N 13/0418* (2013.01); *H04N 13/0459* (2013.01); *H04N 13/0497* (2013.01)

(58) Field of Classification Search
CPC ........... H04N 13/0418; H04N 13/0459; H04N 13/0497; G03H 1/26; G03H 1/00; G03H 1/02; G03H 1/08; G03H 2001/0421; G03H 2001/0423; G03H 2001/0426; G09F 19/00
USPC ...... 359/15, 17, 19, 20, 22–25, 27, 458, 464
See application file for complete search history.

(56) References Cited

U.S. PATENT DOCUMENTS

| | | | |
|---|---|---|---|
| 9,310,769 B2* | 4/2016 | Smithwick | G03H 1/26 |
| 2004/0056824 A1 | 3/2004 | Sudo et al. | |
| 2010/0142016 A1* | 6/2010 | Cable | G03H 1/22 359/9 |
| 2010/0214537 A1* | 8/2010 | Thomas | G02B 27/225 353/7 |

FOREIGN PATENT DOCUMENTS

| | | |
|---|---|---|
| JP | 2002-287086 A1 | 10/2002 |
| JP | 2002-303821 A1 | 10/2002 |
| JP | 2004-184938 A1 | 7/2004 |
| JP | 2007-240965 A1 | 9/2007 |
| JP | 2012-220606 A1 | 11/2012 |

OTHER PUBLICATIONS

International Search Report (Application No. PCT/JP2014/051988) dated Mar. 4, 2014.
International Preliminary Report on Patentability (App. No. PCT/JP2014/051988) mailed Aug. 13, 2015.

* cited by examiner

STEREOSCOPIC IMAGE DISPLAY APPARATUS

BACKGROUND OF THE INVENTION

Field of the Invention

The present invention relates to a stereoscopic image display apparatus capable of displaying parallax images.

Description of Related Art

Stereoscopic image display apparatuses have attracted attention because movies with stereoscopic images became a big hit. In conventional stereoscopic image display apparatuses, however, viewers have to wear eyeglasses, which is troublesome and tiresome.

Because of this, several methods which allow viewers to view stereoscopic images without glasses have been proposed and made into a product. For example, Japanese Patent Laid-Open Publication No. 2007-240965 discloses a technique of displaying multi-viewpoints directional images by time division while changing the light direction at a high speed by time division. The quarterly report of the National Institute of Information and Communications Technology discloses, in Vol. 56 Nos. 1/2 2010 P. 43-P. 52, a technique of displaying stereoscopic images, with a projector array having projectors arranged in the horizontal and vertical directions and a rear screen having the scattering characteristics of narrower and wider angles in the horizontal and vertical directions with respect to the incident light from the projector array.

SUMMARY OF THE INVENTION

In viewing a plurality of parallax images without glasses, there is a problem of crosstalk between the parallax images, or superimposition of the parallax images. Conventionally, as disclosed in Japanese Patent Laid-Open Publication No. 2007-240965, a plurality of light sources such as LEDs arranged apart from one another are sequentially turned on to emit different parallax images at different angles. The emitted light beams converge on a viewing plane via a lens. Therefore, if the gap between adjacent light sources is large, the final angles of emitted light beams are largely different from one another for the respective light sources, which widen the emitted-light angle range for each parallax image. This results in a difficulty in finding out a stereoscopic-image viewable range.

In order to restrict the emission angles from being largely different from one another, the quarterly report of the National Institute of Information and Communications Technology discloses, in Vol. 56 Nos. 1/2 2010 P. 43-P. 52, a technique to give slight scattering characteristics to a screen disposed on a viewing plane. However, the scattering characteristics of screens usually show a Gaussian distribution. Therefore, it is difficult to completely remove crosstalk. Moreover, the optimum scattering characteristics is limited to an extremely narrow range, and thus it is difficult to design and produce the screen, thereby leading to high costs.

In view of the above problems, a purpose of the present invention is to provide a stereoscopic image display apparatus that makes parallax images viewable in a wide range, with a simple configuration.

In order to solve the problems above, according to an aspect of the present invention, there is provided a stereoscopic image display apparatus comprising:

an optical device having an n (n being an integer of 2 or more) number of regions provided corresponding to the n number of parallax images, respectively, each region being capable of diffusing a coherent light beam;

an irradiation unit to irradiate the optical device with a coherent light beam to scan the n number of the regions with the coherent light beam;

a spatial light modulator that is illuminated with a coherent light beam incident on each of positions of the optical device and then diffused, to generate a modulated image corresponding to each of the n number of the regions, in sync with the scanning of the n number of the regions by the coherent light beam; and a projection optical system to project the n number of the parallax images generated by the modulated image onto one plane so that the parallax images are superimposed on one another on the one plane at different angles.

In sync with the scanning of the n number of the regions with the coherent light beam, a modulated image is generated by the spatial light modulator, and then the n number of parallax images generated from the modulated image are projected onto the same plane at different angles. Therefore, a viewing field for a viewer to view different parallax images with the viewer's right and left eyes is widened to give a wider viewing field for viewing a stereoscopic image.

The projection optical system may comprise a diffusing member that allows a larger parallax image to be viewed.

The diffusing member may have more excellent diffusion characteristics in one direction than in another direction. When the other direction is the vertical direction, the viewer can correctly view a parallax image even if the viewer's eyes are shifted in the vertical direction.

Moreover, a condensing optical system may be provided to converge the n number of the parallax images generated from the modulated image on respective regions of an optical component disposed on the projection optical system. The condensing optical system makes modulated image beams efficiently converge on the projection optical system, which allows the projection optical system to have a smaller diameter.

As the optical device, a hologram recording medium may be provided, which allows an interference fringe to be formed for the n number of the regions, hence the optical device can be relatively easily produced. In this case, the hologram recording medium is disposed so that the longitudinal direction of the n number of rectangular regions corresponding to n number of the regions is perpendicular to the horizontal direction of the same plane, which allows the projection optical system to arrange the n number of the parallax images in the horizontal direction. Moreover, as the optical device, a lens array may be used.

The n number of the rectangular regions may be closely arranged. With the arrangement, the irradiation unit can continuously scan the n number of the rectangular regions even on the border therebetween.

When the irradiation unit scans the n number of the rectangular regions in the longitudinal direction of each rectangular and while the irradiation unit is scanning one of the rectangular regions, the spatial light modulator may continuously generate one and the same modulated image, which enables that the n number of parallax images are formed in a time division manner.

A position detector may be provided to detect a viewer's view direction to restrict scanning range on the optical device with a coherent light beam so that a parallax image is viewed at the viewer's view direction. With the restricted scanning range, the viewer can view stereoscopic images with no failure without changing the view direction. Moreover, with the restricted scanning range of a coherent light beam, the use efficiency of the coherent light beam is improved to make it possible to project higher-intense parallax images onto a screen.

A scanning device may scan the optical device with a coherent light beam, which makes speckles superimposed on one another on the same plane in time to be inconspicuous.

The light source may comprise a plurality of light sources that emit a plurality of coherent light beams having different wavelength ranges, which enables color stereoscopic-image viewing.

According to the present invention, a stereoscopic image display apparatus is realized to make parallax images viewable in a wide range on the same plane, with a simple configuration.

DETAILED DESCRIPTION OF THE INVENTION

Hereinafter, embodiments of the present invention will be explained with reference to the drawings. In the accompanying drawings of the present description, in order to simplify drawings and facilitate understanding, the scale, the ratio of height to width, etc., are appropriately modified or enlarged.

Figure 1:
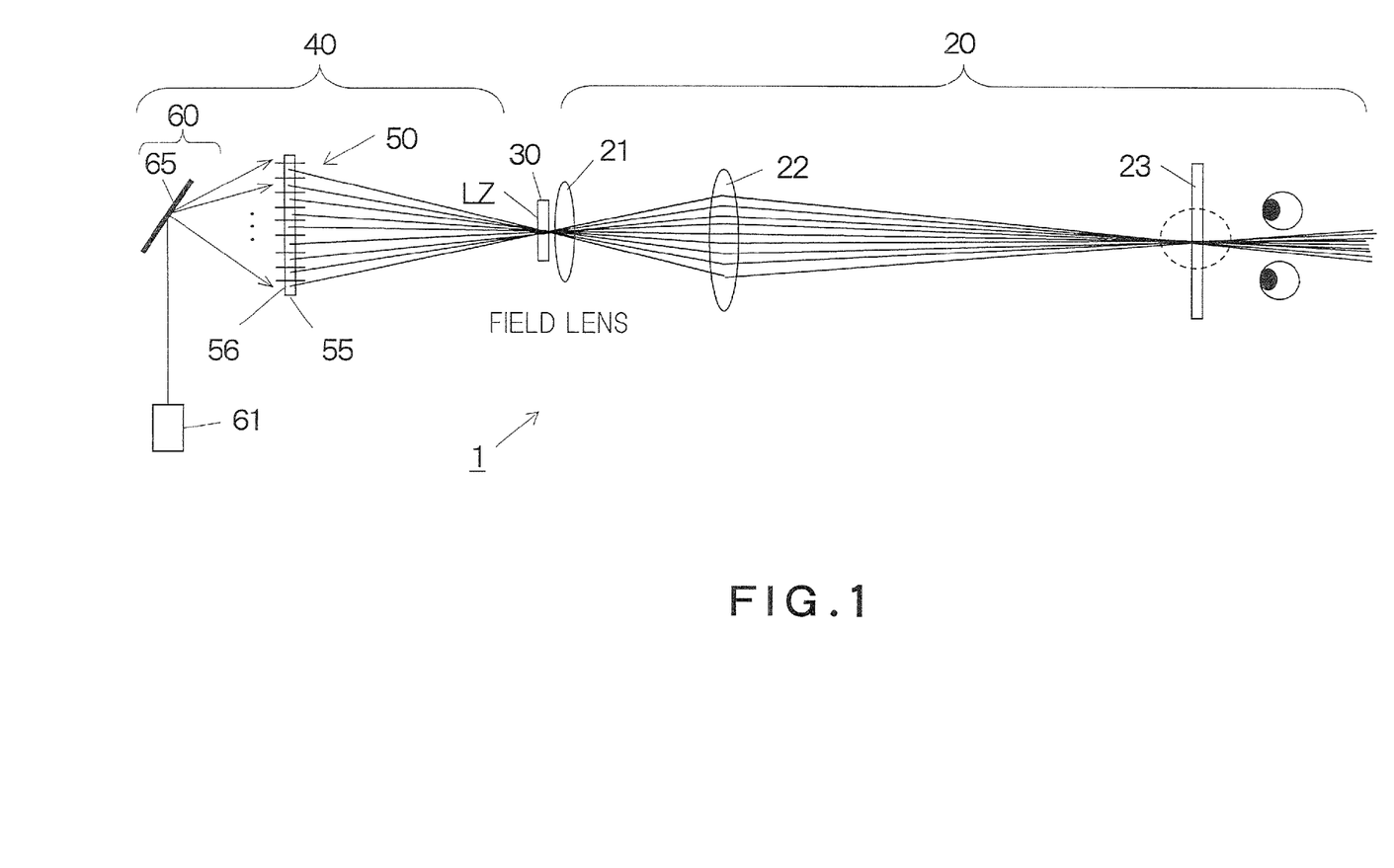
FIG. 1 is a view schematically showing the configuration of a stereoscopic image display apparatus according to an embodiment of the present invention.

FIG. 1 is a view schematically showing schematic configuration of a stereoscopic image display apparatus according to an embodiment of the present invention. The stereoscopic image display apparatus 1 of FIG. 1 is provided with an optical device 50, an irradiation unit 60, a spatial light modulator (SLM) 30, and a projection optical system 20.

The optical device 50 is provided so as to correspond to each of an n (n being an integer of 2 or more) number of parallax images. The optical device 50 has the n number of regions 56 each capable of diffusing a coherent light beam. The optical device 50 has a hologram recording medium 55 that can reproduce an image of a scattering plate on an illumination zone LZ that is disposed to be overlapped with the spatial light modulator 30, for example. The hologram recording medium 55 will be explained later in detail.

The irradiation unit 60 irradiates the optical device 50 with a coherent light beam to scan the n number of the regions 56 on the optical device 50. The irradiation unit 60 is provided with a laser source 61 that emits a coherent light beam and a scanning device 65 that scans the surface of optical device 50 with the coherent light beam emitted by the laser source 61.

The scanning device 65 changes a reflection angle of an incident coherent light beam at a regular interval to scan the hologram recording medium 55 with the reflected coherent light beam.

The spatial light modulator 30 is illuminated with a coherent light beam that is incident on each position of the optical device 50 from the irradiation unit 60 and is then diffused by the optical device 50. The illuminated spatial light modulator 30 generates a modulated image that corresponds to each of the n number of the regions 56, in sync with the scanning of the n number of the regions 56 with the coherent light beam. Each position is any position in the n number of the regions 56 of the optical device 50 on which a coherent light beam reflected by the scanning device 65 is incident.

As the spatial light modulator 30, for example, a transmission-type liquid crystal microdisplay can be used. In this case, the spatial light modulator 30 is illuminated by the irradiation unit 60 in the plane direction and coherent light beams pass through the spatial light modulator 30 selectively per pixel. In this way, a modulated image is formed on a display that is the spatial light modulator 30. The generated modulated image, i.e. an image light is modified by the projection optical system 20 to vary its size and projected onto the screen 23. In this way, a modulated image is displayed on the screen 23 with a varied size, i.e. usually, magnified, so that a viewer can view the image.

As the spatial light modulator 30, a reflection-type microdisplay can also be used. In this case, a modulated image is generated by reflected light beams at the spatial light modulator 30 so that a plane on the spatial light modulator 30 illuminated with coherent light beams from the irradiation unit 60 and an emitting plane for light beams of an image, i.e. reflected light beams, of a modulated image generated by the spatial light modulator 30 become the same plane. When utilizing such reflected light beams, it is possible to use a MEMS (Micro Electro Mechanical Systems) device such as a DMD (Digital Micromirror Device) as the spatial light modulator 30.

In FIG. 1, an illumination device 40 is constituted by the irradiation unit 60 and the optical device 50. The illumination device 40 illuminates an illumination zone LZ disposed to be overlapped with the spatial light modulator 30.

It is preferable that the incidence plane of the spatial light modulator 30 has the same shape and size as the illumination zone LZ that is illuminated with coherent light beams by the irradiation unit 60. The reason is that coherent light beams from the irradiation unit 60 can be used for displaying an image on the screen at high utilization efficiency.

The projection optical system 20 projects the n number of parallax images generated from a modulated image generated by the spatial light modulator 30 onto the same plane at different angles so that the parallax images are superimposed on one another. The projection optical system 20 has a field lens (condensing optical system) 21, a projection lens (optical member) 22, and the screen 23.

The field lens 21 is used for varying the size of a modulated image generated by the spatial light modulator 30. Since the field lens 21 is not an essential component, it may be omitted. Nevertheless, by providing the field lens 21, the modulated image generated by the spatial light modulator 30 can be effectively incident on the projection lens 22. When the field lens 21 is omitted, the projection lens 22 requires a larger size so that the modulated image from the spatial light modulator 30 is incident thereon.

The field lens 21 converges the n number of the parallax images generated from the modulated image onto respective regions on the projection lens 22. The projection lens 22 is an essential component to be used for projecting the n number of the parallax images converged on the respective regions onto the screen 23 in a manner that the n number of the parallax images are superimposed on one another.

The screen 23 has a diffusing member with a diffusing surface. FIG. 1 shows an example of using a transmission-type screen 23. The screen 23 may be omitted or replaced with a mirror.

In FIG. 1, using the transmission-type screen 23, a viewer views parallax images at one side of the screen 23, which is opposite to the other side at which the irradiation unit 60 and the other components are arranged. Hereinbelow, the side of the screen 23 at which the viewer views the parallax images is defined as the front side of the screen 23.

The transmission-type screen 23 of FIG. 1 may or may not have diffusion characteristics in the horizontal direction of the diffusing surface. However, the transmission-type screen 23 has a wide diffusion angle in the direction perpendicular to the diffusing surface. In other words, the transmission-type screen 23 has more excellent diffusion characteristics in one direction than in another direction. With the diffusion characteristics settings, in the horizontal direction, the viewer can view a plurality of parallax images incident at different angles whereas, in the vertical direction, due to largely different incidence angles, the viewer can correctly view the parallax images even if the viewer' eye positions are deviated in the vertical direction. The horizontal direction is defined as a direction in which horizontally adjacent pixels of a stereoscopic image seen on the transmission-type screen 23 are aligned.

Hereinbelow, an example of using a hologram recording medium 55 as the optical device 50 will be explained first. The hologram recording medium 55 in the present embodiment is divided into the n number of rectangular regions 56. An interference fringe is formed in each rectangular region 56. When a coherent light beam is incident on each rectangular region 56, the coherent light beam diffracted by the interference fringe is emitted as a diffused light beam. In more detail, a coherent light beam that is incident on each position in any rectangular region 56 of the hologram recording medium 55 from the irradiation unit 60 is diffracted by the hologram recording medium 55 and then projected onto the screen 23 after passing through the field lens 21 and the projection lens 22.

In the present embodiment, the rectangular regions of the hologram recording medium 55 are arranged so that the longitudinal direction of each rectangular region 56, or the depth direction of the drawing sheet of FIG. 1, is perpendicular to the horizontal direction of the diffusing surface.

Figure 2:
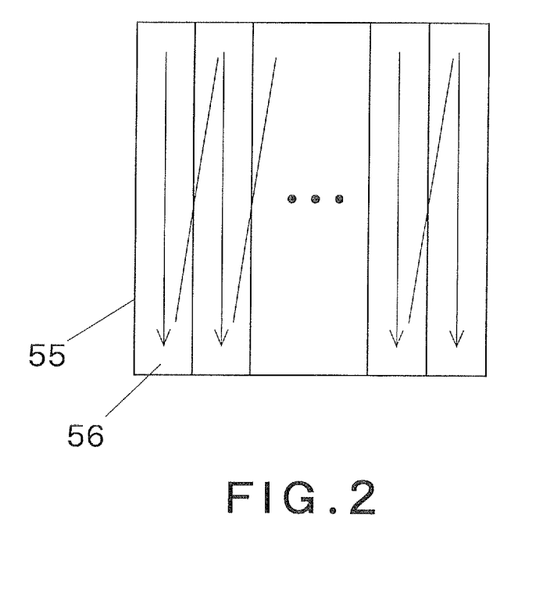
FIG. 2 is a view showing a scanning direction on the recording surface of a hologram recording medium 55.
Figure 3:
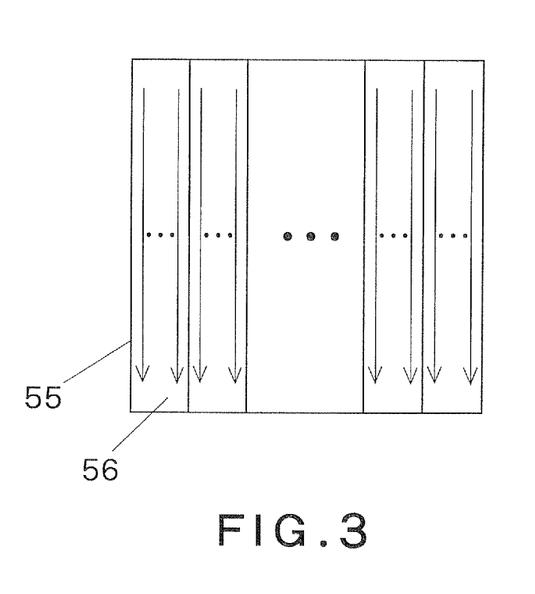
FIG. 3 is a view showing a modification to FIG. 2.

FIG. 2 is a view showing a recording surface of the hologram recording medium 55. The irradiation unit 60 scans the n number of the rectangular regions 56 with a coherent light beam sequentially in the longitudinal direction. FIG. 2 shows a scanning direction with an arrow for one-time scanning of one rectangular region 56 with a coherent light beam. Practically, as shown in FIG. 3, one rectangular region 56 may be scanned several times at high speeds.

The n number of the rectangular regions 56 are closely arranged. The irradiation unit 60 continuously scans the rectangular regions 56 even when a coherent light beam crosses the border of the rectangular regions 56. With this scanning mechanism, a plurality of parallax images projected onto the screen 23 widen in the horizontal direction, which gives a wide viewing field for the viewer to view a stereoscopic image.

While the irradiation unit 60 is scanning one rectangular region 56 with a coherent light beam, the spatial light modulator 30 continuously generates one and the same modulated image. When a coherent light beam starts scanning of a rectangular region 56 adjacent to the one rectangular region 56, in sync with this, the spatial light modulator 30 changes the modulated image.

As described above, the scanning of each rectangular region 56 by the irradiation unit 60 with a coherent light beam and the change in the modulated image generated by the spatial light modulator 30 are performed in a synchronous manner. Therefore, when the scanning of the n number of the rectangular regions 56 is completed, parallax images of one frame are projected onto the same region of the screen 23 in a time-division manner. The n number of the parallax images are projected onto the same region of the screen 23 at different angles. The n number of the parallax images are sequentially arranged in the horizontal direction of the projection lens 22.

Figure 4:
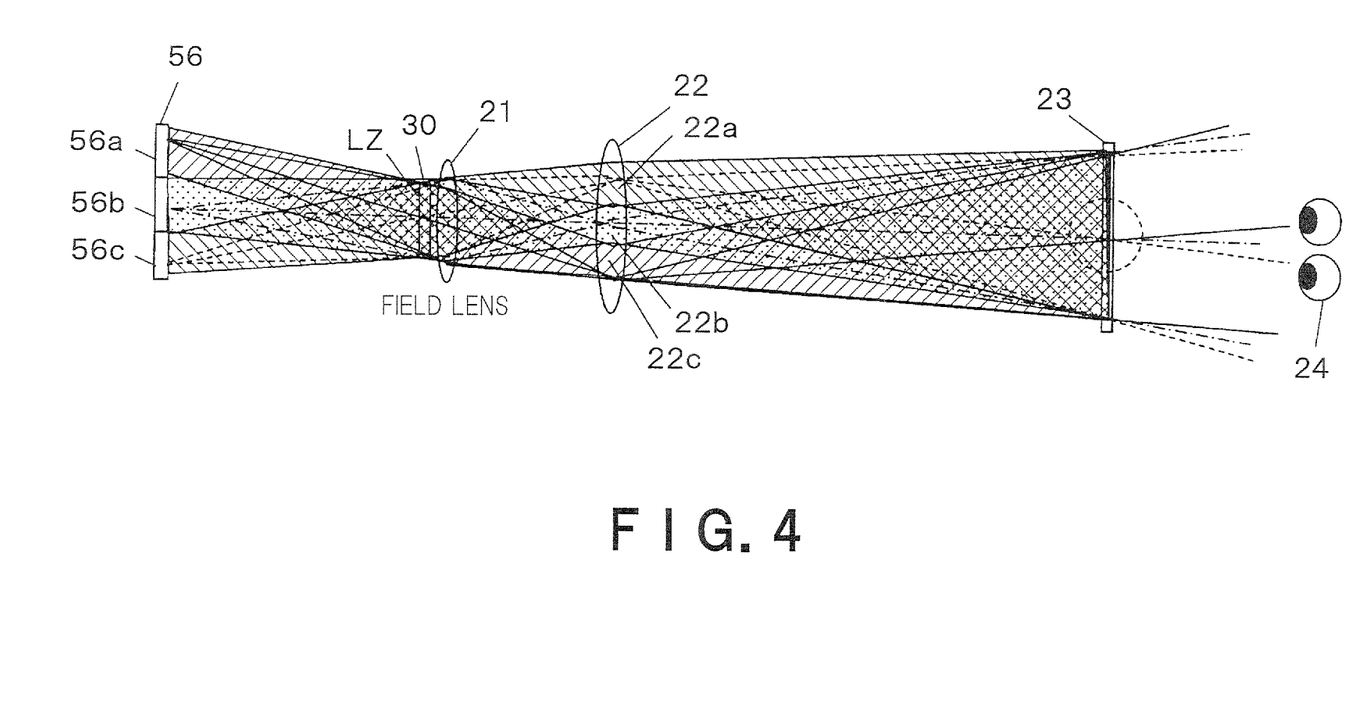
FIG. 4 is a view illustrating a state in which parallax images are expanded in the horizontal direction.

FIG. 4 is a view illustrating a projection direction in which parallax images are projected. For simplicity, FIG. 4 shows an example in which the hologram recording medium 55 is divided into three rectangular regions 56a, 56b and 56c. As shown, in sync with the scanning of each rectangular region 56 with a coherent light beam from the irradiation unit 60, the spatial light modulator 30 generates a modulated image corresponding to each rectangular region 56. The modulated image is then projected onto the screen 23 via the field lens 21 and the projection lens 22.

A coherent light beam from the rectangular region 56a illuminates the entire illumination zone LZ disposed to be overlapped with the spatial light modulator 30. A parallax image that is a modulated image illuminated with the coherent light beam is projected onto the entire screen 23 after converged by the field lens 21 on a region 22a that is one region in the projection lens 22.

A coherent light beam from the rectangular region 56b illuminates the entire illumination zone LZ. A parallax image that is a modulated image illuminated with the coherent light beam is projected onto the entire screen 23 after converged by the field lens 21 on a region 22b that is another region in the projection lens 22.

A coherent light beam from the rectangular region 56c illuminates the entire illumination zone LZ. A parallax image that is a modulated image illuminated with the coherent light beam is projected onto the entire screen 23 after converged by the field lens 21 on a region 22c that is still another region in the projection lens 22.

The regions 22a, 22b and 22c are closely arranged in the horizontal direction of the projection lens 22. On the projection lens 22, three different parallax images are sequentially arranged. These parallax images are incident on the screen 23 at different angles.

The spatial light modulator 30 generates parallax images in sync with the scanning of rectangular regions 56a to 56c with coherent light beams. In other words, the spatial light modulator 30 changes the parallax images synchronous with which the rectangular regions 56a to 56c are scanned with a coherent light beam.

As shown in FIG. 4, when an viewer 24 in front of the screen 23 focuses the viewer's eyes on a horizontal position on the screen 23, the viewer 24 views a parallax image that corresponds to any one of the regions 22a to 22c on the projection lens 22, the region being located in the viewer's view direction that meets the horizontal position. For the viewer's eyes, the parallax image is seen as if it were formed on the screen 23.

When the viewer's eyes are located on the positions shown in FIG. 4, the viewer views a parallax image corresponding to the rectangular region 56a with the viewer's right eye and a parallax image corresponding to the rectangular region 56c with the viewer's left eye. With these parallax images, an image is stereoscopically seen around the screen 23 for the viewer.

In the example of FIG. 4, 3-parallax image display is performed with the hologram recording medium 55 divided into the three rectangular regions 56. In this example, the projection lens 22 has a relatively wide region for one parallax image to be seen. Such a region of the projection lens 22 for one parallax image to be seen is made narrower with narrower rectangular regions 56, which achieves further multi-parallax stereoscopic image display.

Figure 5A:
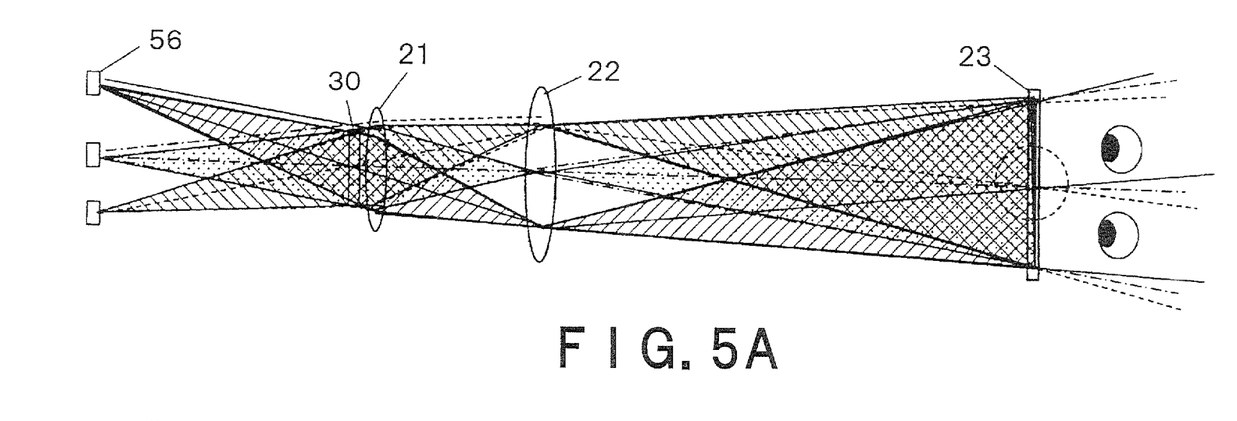
FIG. 5A is a view showing a comparative example in which, as an optical device 50, a plurality of laser sources 61 are arranged apart from one another.
Figure 5B:
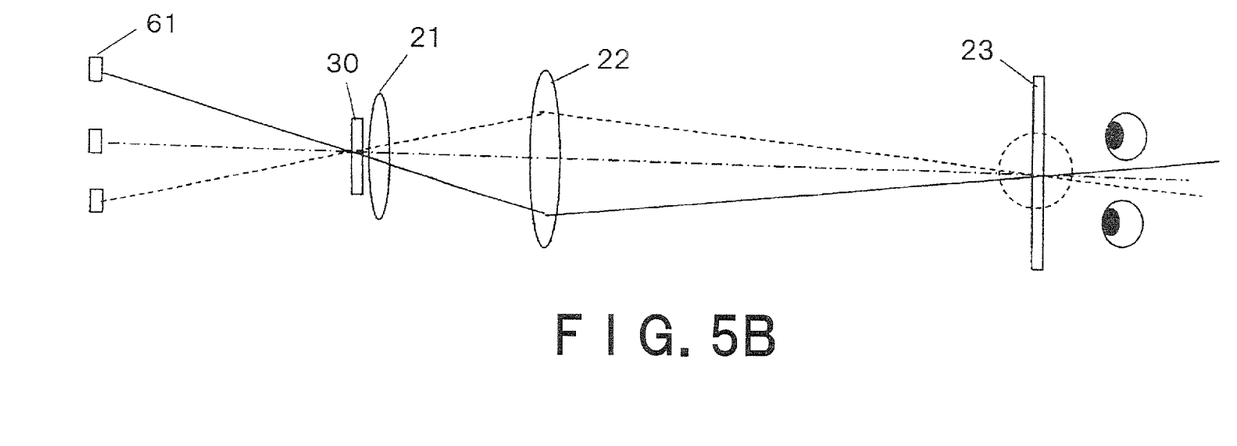
FIG. 5B is a view showing the arrangement of FIG. 5A, illustrated with main coherent light beams only.

FIG. 5A is a view showing a comparative example in which, as the optical device 50, a plurality of laser sources 61 are arranged apart from one another. FIG. 5B is a view showing the arrangement of FIG. 5A, illustrated with main coherent light beams only.

In the comparative example, three laser sources 61 are sequentially turned on and, in sync with the switching of the laser sources 61, the spatial light modulator 30 generates different parallax images. In this kind of example with a plurality of laser sources 61 arranged apart from one another, the locations of parallax images are scattered on the projection lens 22. When the viewer focuses the viewer's eyes on a position on the screen 23, the viewer can view a parallax image on the screen 23 only when a focal point on the screen 23 and a position on the projection lens 22, at which the parallax image is formed, are aligned in the viewer' view direction.

The projection lens 22 has an extremely small imaging range for parallax images. The viewer thus cannot view parallax images if the viewer slightly shifts the viewer's view direction, even if viewable in a particular view direction. Therefore, the comparative example has a disadvantage of extremely small viewing field for viewing stereoscopic images. By increasing the number of laser sources 61, the number of view directions in which stereoscopic images are viewable is also increased. Nevertheless, stereoscopic images are still viewable in scattered locations, and hence it is difficult in the comparative example to widen the viewing field.

In the comparative example of FIG. 5, the positions at which parallax images are viewable depend on the distance among a plurality of laser sources 61, the size of the projection lens 22, and the distance between the projection lens 22 and the screen 23. However, no matter how those factors are considered, the positions at which parallax images are viewable are dispersed. Therefore, it is difficult for the viewer to find out a viewable position, because even if the viewer slightly shifts left or right, stereoscopic images become unviewable.

As discussed above, in such a technique with a plurality of laser sources 61 arranged apart from one another, parallax images are only viewable discretely. Therefore, it is impossible in the comparative example to make parallax images viewable in a continuous large region like the present embodiment.

Figure 6:
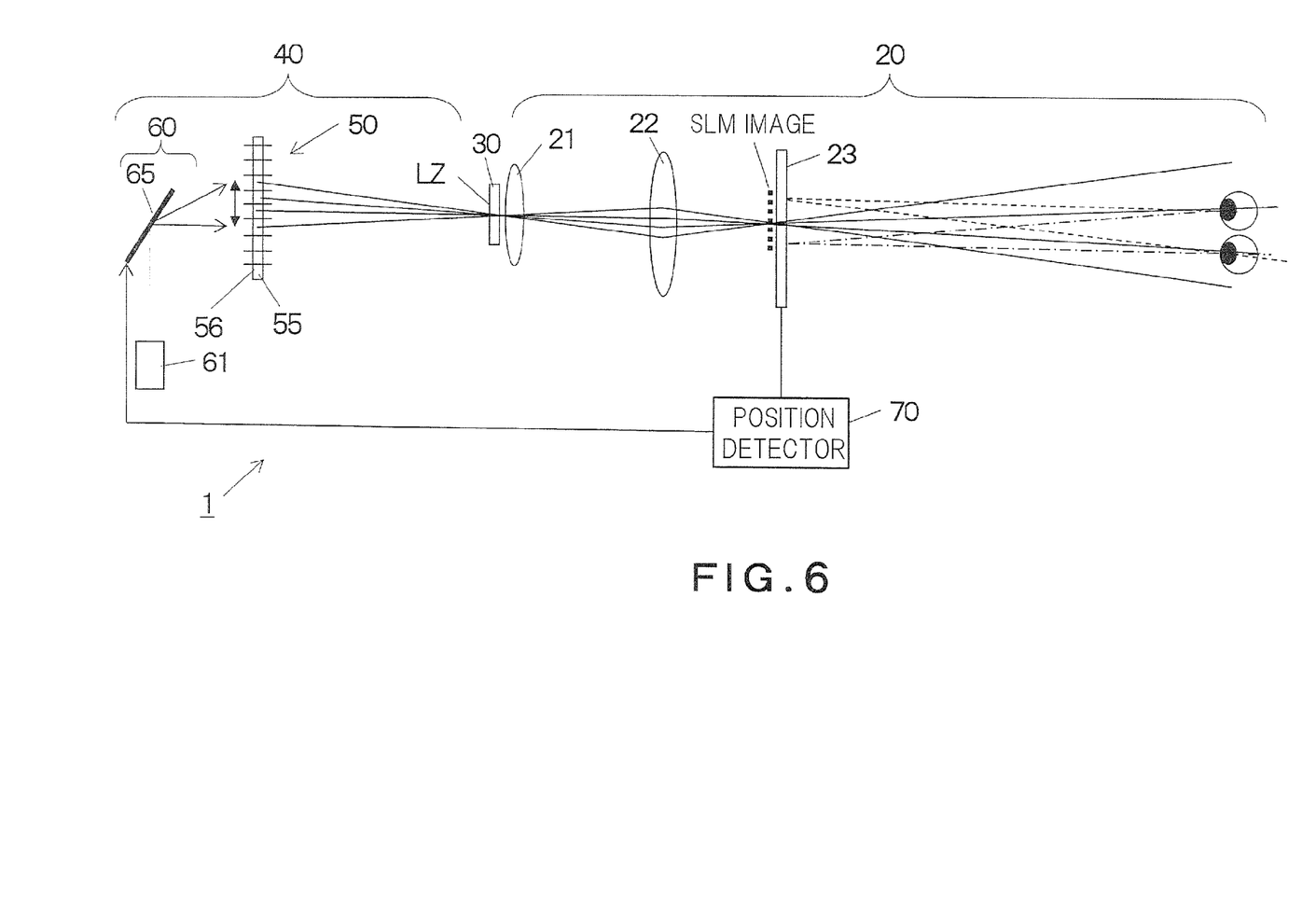
FIG. 6 is a view showing a modification to the present embodiment.

FIG. 6 is a view showing a modification to the present embodiment. A stereoscopic image display apparatus 1 of FIG. 6 is provided with a position detector 70 for detecting a viewer's position, in addition to the components shown in FIG. 1. The irradiation unit 60 controls a coherent-light beam scanning range in accordance with a viewer's position detected by the position detector 70.

The position detector 70 detects, for example, a viewer's view direction. There are a variety of techniques for detecting the view direction. One technique is, for example, to capture an image of a region at the viewer side in front of the screen 23 with a camera (not shown) attached to the screen 23 and analyze the captured image to extract a human eye region, and extract further the center of pupil of each eye in the human eye region, thereby detecting a viewer's view direction.

The viewer's view direction detected by the position detector 70 is sent to the irradiation unit 60. In order for parallax images to be projected in the viewer's view direction, the irradiation unit 60 scans only one part of the n number of the regions 56 on the optical device 50 with coherent light beams. The spatial light modulator 30 generates modulated images in accordance with the regions scanned by the irradiation unit 60 with the coherent light beams.

As described above, the irradiation unit 60 of FIG. 6 is capable of scanning a smaller region on the optical device 50 with coherent light beams. Since the use efficiency of coherent light beams is improved, the irradiation unit 60 of FIG. 6 can project higher-intensity parallax images onto the screen 23.

There is a case where there are a plurality of viewers in front of the screen 23. In this case, the position detector 70 detects the view direction of each viewer. Based on the detection result, the irradiation unit 60 scans necessary regions only among the n number of the regions 56 on the optical device 50 with a coherent light beam so that parallax images are projected in the view direction of every viewer.

As described above, in the present embodiment, the n number of the regions 56 on the optical device 50 are sequentially scanned with a coherent light beam. While one region 56 is being scanned with the coherent light beam, the spatial light modulator 30 generates one and the same modulated image. However, when the region 56 scanned with the coherent light beam changes, the spatial light modulator 30 generates a different modulated image. The different modulated image is then projected onto the screen 23 after converged on the corresponding region on the projection lens 22. Accordingly, the present embodiment offers a large viewing field for viewing stereoscopic images so that the viewer can view stereoscopic images in a large region in the horizontal direction through the screen 23.

In the embodiment described above, the hologram recording medium 55 is formed with the rectangular regions 56 which are arranged in a manner that the longitudinal direction of each rectangular region 56 is perpendicular to the horizontal direction of the diffusing surface. However, the rectangular regions 56 may be arranged in a manner that the longitudinal direction of each rectangular region 56 meets the horizontal direction of the diffusing surface. In this case, a specific control is required in which, while the irradiation unit 60 is scanning one region 56 with a coherent light beam, the spatial light modulator 30 generates a modulated image only at a particular timing, but does not generate any image at the other timings, instead of continuously generating the same modulated image.

The hologram recording medium 55 may not be divided in a rectangular shape but may be in a grid shape, for example. In the case where the hologram recording medium 55 is divided in the grid shape, while the irradiation unit 60 is scanning one grid region with a coherent light beam, the spatial light modulator 30 generates the same modulated image. However, when the grid region scanned with the coherent light beam changes, the spatial light modulator 30 generates a different modulated image. According to this control, parallax images can be projected, not only in the horizontal direction of the screen 23, but also in the vertical direction of the screen 23, which achieves further multi-viewing with a larger viewing field for viewing stereoscopic images.

In the present embodiment, a coherent light beam that corresponds to a parallax image to be projected onto the screen 23 is projected onto the screen 23 with the incidence angle varying with time. Therefore, speckles caused by the scattering of the coherent light beam on the screen 23 are superimposed on one another in time and hence become inconspicuous.

Next, the hologram recording medium 55 used in the present embodiment will be explained. In the present embodiment, a coherent light beam for scanning the hologram recording medium 55 after reflected by the scanning device 65 is incident on each position on the hologram recording medium 55 at an incidence angle that satisfies the diffraction condition of the hologram recording medium 55. Since the interference fringes are formed on the hologram recording medium 55, coherent light beams incident on respective points on the hologram recording medium 55 are diffracted by the interference fringes and illuminate the same illumination zone LZ. In more in detail, the coherent light beams incident on respective points on the hologram recording medium 55 are superimposed on one another to reproduce an image of a scattering plate on the illumination zone LZ.

Figure 7:
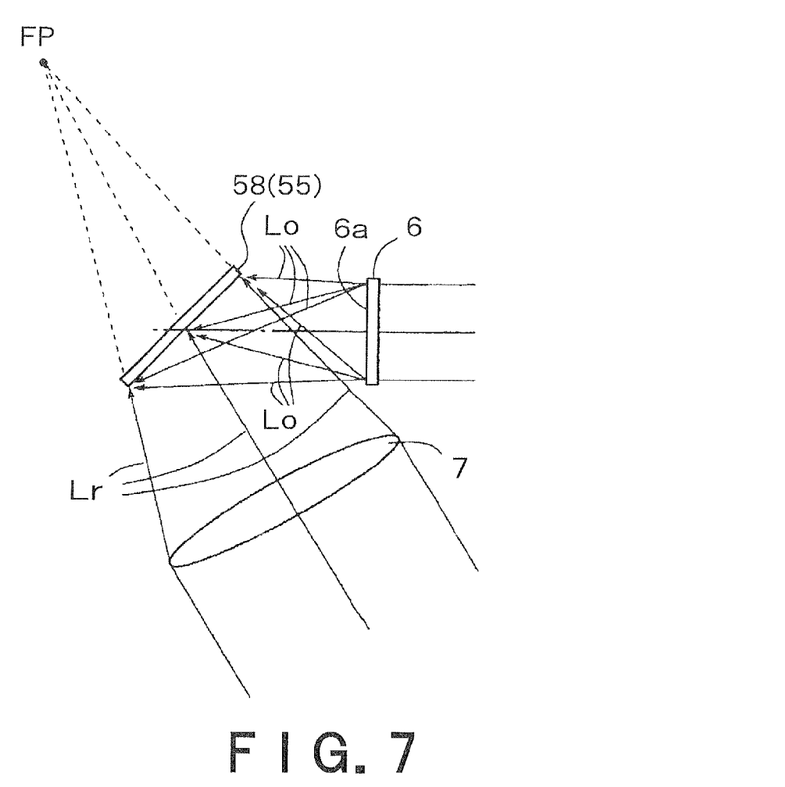
FIG. 7 is a view explaining a state in which an image of a scattering plate 6 is generated on a hologram recording medium 55, as interference fringes.

As for the hologram recording medium 55 that enables the diffraction of coherent light beams described above, for example, a transmission-type volume hologram using photopolymer may be used. FIG. 7 is a view explaining a state in which an image of a scattering plate 6 is generated on the hologram recording medium 55, as interference fringes. Here, the scattering plate 6 is a reference member for scattering light and it does not matter what a configuration the scattering plate 6 has.

As shown in FIG. 7, the hologram recording medium 55 is produced using scattered light beams from an actual scattering plate 6 as object beams Lo. FIG. 7 shows a state in which a hologram photosensitive material 58 having photosensitivity is exposed to reference beams Lr and object beams Lo, both being coherent lights having coherence to each other, thereby producing the hologram recording medium 55.

As for the reference beams Lr, for example, laser beams from a laser source 61 that oscillates laser beams in a specific wavelength range are used. The reference beams Lr pass through a condenser element 7 made of a lens and are incident on the hologram photosensitive material 58. In the example shown in FIG. 7, laser beams for the reference beams Lr are incident on the condenser element 7 as a parallel light flux that is parallel with the optical axis of the condenser element 7. By passing through the condenser element 7, the reference beams Lr are reshaped, i.e. converted, from a parallel light flux into a convergent light flux and incident on the hologram photosensitive material 58. On this occasion, a focal point FP of the convergent light flux Lr is located at a position beyond the hologram photosensitive material 58. In other words, the hologram photosensitive material 58 is located between the condenser element 7 and the focal point FP of the convergent light flux Lr collected by the condenser element 7.

Next, the object beams Lo are incident on the hologram photosensitive material 58 as scattered light from the scattering plate 6 made of opal glass, for example. In the example shown in FIG. 7, the hologram recording medium 55 to be produced is a transmission type and the object beams Lo are incident on the hologram photosensitive material 58 on the same side as the reference beams Lr. It is a precondition that the object beams Lo are coherent with the reference beams Lr. Therefore, for example, it is possible to separate laser beams oscillated by the same single laser source and use one of the separated ones as the reference beams Lr and the other as the object beams Lo.

In the example shown in FIG. 7, a parallel light flux that is parallel with the direction of normal to the plate surface of the scattering plate 6 is incident on the scattering plate 6 and scattered, and then the scattered beams that have passed through the scattering plate 6 are incident on the hologram photosensitive material 58 as the object beams Lo. According to this method, when an isotropic scattering plate available at low cost is used as the scattering plate 6, the object beams Lo can be easily incident on the hologram photosensitive material 58 at roughly constant intensity distribution. Moreover, according to this method, although depending on the degree of scattering by the scattering plate 6, the reference beams Lr can be easily incident on respective positions of the hologram photosensitive material 58 at roughly constant intensity from the entire region of a light-emitting surface 6a of the scattering plate 6. In such a case, it is achievable that light beams incident on respective positions of the obtained hologram recording medium 55 reproduce images 5 of the scattering plate at similar brightness and reproduced images 5 of the scattering plate 6 are observed at roughly constant brightness.

As described above, when the hologram photosensitive material 58 is exposed to the reference beams Lr and object beams Lo, interference fringes caused by the interference between the reference beams Lr and object beams Lo are generated and interference fringes of these light beams are recorded in the hologram photosensitive material 58 as some form of pattern, i.e. an refractive index modulation pattern, as one example in a volume hologram. Thereafter, an appropriate posttreatment corresponding to the type of the hologram photosensitive material 58 is applied, thereby obtaining the hologram recording medium 55.

Figure 8:
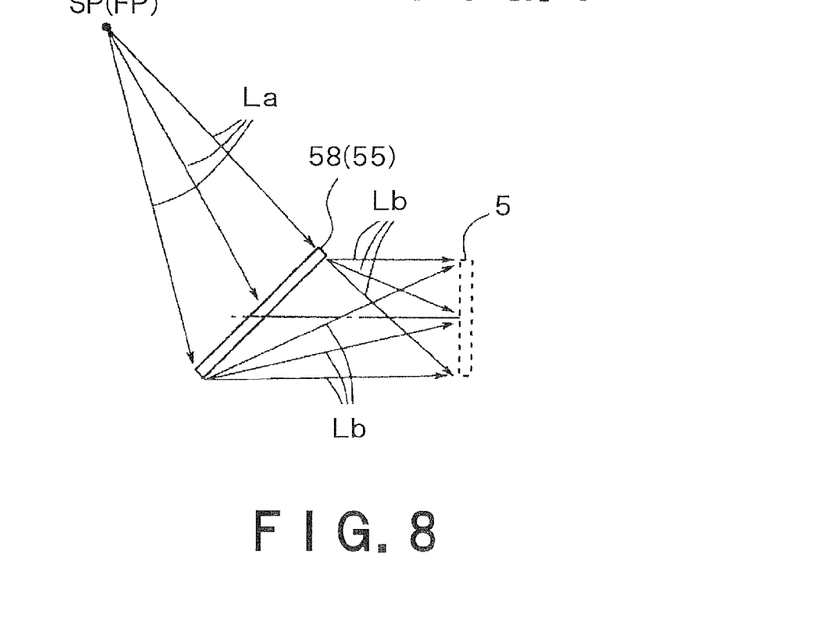
FIG. 8 is a view explaining a state in which an image of a scattering plate is reproduced using interference fringes formed in the hologram recording medium 55 obtained through an exposure process of FIG. 7.

FIG. 8 is a view explaining a state in which an image of a scattering plate is reproduced using interference fringes formed in the hologram recording medium 55 obtained through an exposure process of FIG. 7. As shown in FIG. 8, the hologram recording medium 55 produced with the hologram photosensitive material 58 of FIG. 7 meets its Bragg condition by means of light beams that have the same wavelength as the laser beams used in the exposure process and travel in a reverse direction of the reference beams Lr along an optical path of the reference beams Lr. Namely, as shown in FIG. 8, a diverging light flux that diverges from a reference point SP located with respect to the hologram recording medium 55 so as to have the same positional relationship as the relative position of the focal point FP in FIG. 7 with respect to the hologram photosensitive material 58 and that has the same wavelength as the reference beams Lr in the exposure process is refracted by the hologram recording medium 55 as the reproduction illumination light beams La, thereby creating the image 5 of the scattering plate 6 at a specific location with respect to the hologram recording medium 50 so as to have the same positional relationship as the relative position of the scattering plate 6 in FIG. 7 with respect to the hologram photosensitive material 58 in the exposure process.

In this occasion, reproduction beams Lb. i.e. beams obtained by diffracting the reproduction illumination light beams La by the hologram recording medium 55, for creating a reproduced image 5 of the scattering plate 6 reproduce respective points of the image 5 of the scattering plate 6 as beams travelling in the reverse direction of the optical path of the object beams Lo travelled towards the hologram photosensitive material 58 from the scattering plate 6 in the exposure process. Moreover, as described above and as shown in FIG. 7, scattered beams Lo emitted from respective points of the light-emitting surface 6a of the scattering plate 6 in the exposure process are diffused, i.e. spread, to be incident on roughly entire region of the hologram photosensitive material 58. Namely, on respective points of the hologram photosensitive material 58, the object beams Lo from the entire region of the light-emitting surface 6a of the scattering plate 6 are incident. As a result, information of the entire light-emitting surface 6a is recorded at respective points of the hologram recording medium 55. It is therefore possible that beams, shown in FIG. 8 which, constitute a diverging light flux from the reference point SP and function as the reproduction illumination light beams La are incident on respective points of the hologram recording medium 55 to reproduce the images 5 of the scattering plate 6 having the same contour as one another at the same location, i.e. the illumination zone LZ, respectively.

The light beams incident on the hologram recording medium 55 are diffracted in the direction of the illumination zone LZ, hence useless scattered light can be effectively restricted. Therefore, all of the reproduction illumination beams La incident on the hologram recording medium 55 can be effectively used for creating the image of the scattering plate 6.

Next, the configuration of the irradiation unit 60 that emits coherent light beams to the optical device 50 made of the hologram recording medium 55 described above will be explained. In the stereoscopic image display apparatus 1 of FIG. 1, the irradiation unit 60 is provided with one laser source 61. However, in order to display color stereoscopic images, it is required to provide three laser sources 61 that correspond to the colors of R, G and B, respectively, for example.

Figure 9:
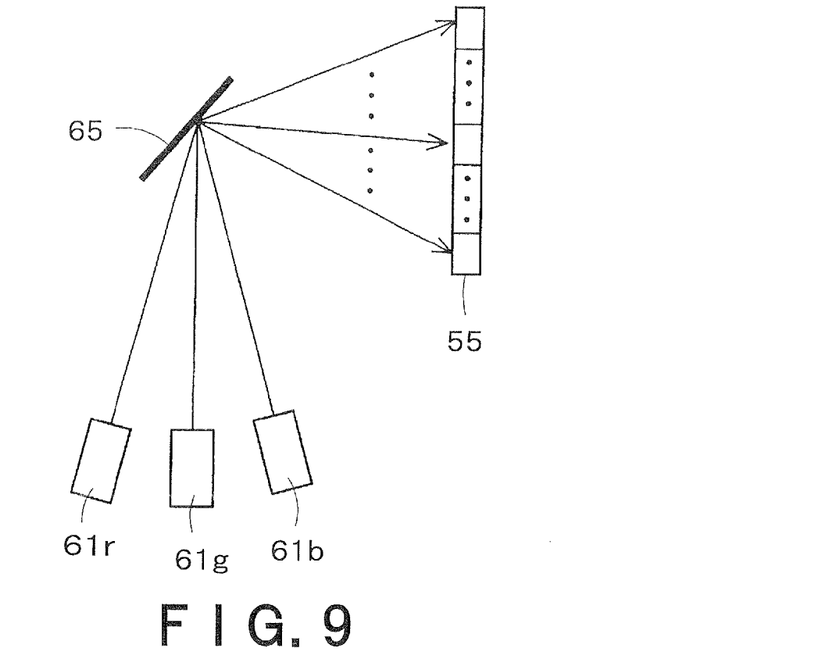
FIG. 9 is a view showing an example of an irradiation unit 60 provided with three laser sources 61.

FIG. 9 is a view showing an example of an irradiation unit 60 provided with three laser sources 61. In this example, there are provided laser sources 61r, 61g and 61b of three colors, each generating coherent light beams, and a scanning device 65 that changes the propagation direction of coherent light beams from these laser sources 61.

The laser sources 61r, 61g and 61b emit coherent light beams of wavelength ranges different from one another. In detail, the laser sources 61r, 61g and 61b emit light in red, green and blue, respectively. In addition to these three types of laser sources, another laser source 61 that has a different wavelength range, that is, that emits light in another color such as yellow may be provided. Moreover, at least one of the laser sources 61r, 61g and 61b may be replaced with a laser source 61 that emits light in another color.

Figure 10:
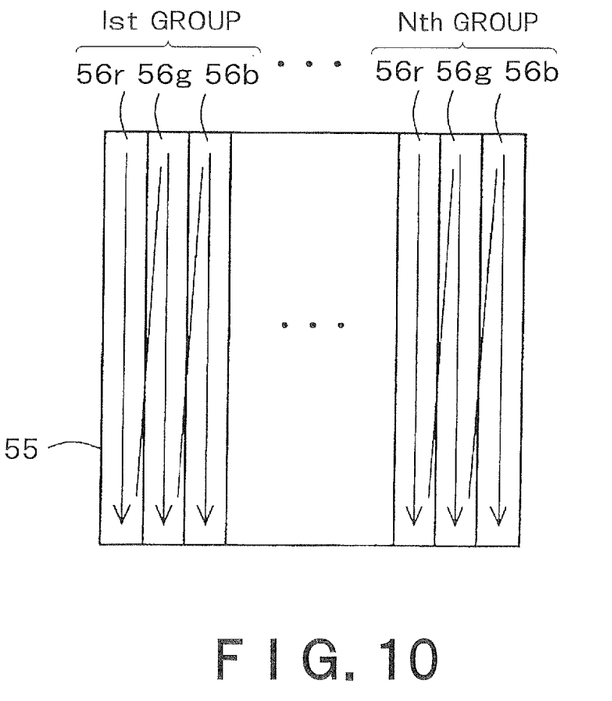
FIG. 10 is a view showing scanning directions on the recording surface of the hologram recording medium 55, associated with FIG. 9.

The hologram recording medium 55 has, for example, as FIG. 10 shows its enraged view, a plurality of closely-arranged groups, each having three rectangular regions 56r, 56g and 56b to be irradiated by the laser sources 61r, 61g and 61b, respectively. Interference fringes that correspond to the closely-arranged groups are repeatedly formed in the hologram recording medium 55. In the example of FIG. 10, an n number of groups each having the rectangular regions 56r, 56g and 56b to be irradiated by the laser sources 61r, 61g and 61b, respectively, are closely arranged in the horizontal direction of the hologram recording medium 55. The laser sources 61r, 61g and 61b simultaneously scan the rectangular regions 56r, 56g and 56b, respectively, in each group. Therefore, the illumination zone LZ is illuminated with a white light of diffused light beams, from the rectangular regions 56r, 56g and 56b, superimposed on other another. Therefore, when the spatial light modulator 30 generates a color modulated image, what is projected onto the screen 23 has the color of this modulated image. Hereinbelow, the rectangular regions 56a, 56b and 56c are referred to as rectangular regions 56 in a generic term.

In FIG. 10, the adjacent groups are required to be closely arranged, whereas the rectangular regions 56r, 56g and 56b in each group may not be closely adjacent to one another, namely, may have gaps thereamong. When there are gaps, coherent light beams reflected by the scanning device 65 are not incident on the gaps. This causes no problems practically. Moreover, the rectangular regions 56r, 56g and 56b in each group may not have the equal area.

In order to form each-color rectangular regions 56 for the n number of the groups on the hologram recording medium 55, in accordance with the principle in FIG. 7, a reference beam Lr and an object beam Lo are emitted to each recording region to form an interference fringe therein.

Although depending on the characteristics of the laser sources 61r, 61g and 61b, a color much closer to white may be reproduced by providing another laser source, for example, a laser source 61 that emits light in yellow, other than red, green and blue. Therefore, there is no particular limitation on the type of laser source provided in the irradiation unit 60. For example, when laser sources of four colors are provided, the hologram recording medium 55 may be formed with the n number of groups of rectangular regions 56 each corresponding to one of the four colors.

The scanning device 65 changes the propagation direction of a coherent light beam with time to direct the coherent light beam in different directions so that the coherent light beam does not travel in the same direction. This results in that the coherent light beam, the propagation direction of which is changed by the scanning device 65, scans the incidence surface of the hologram recording medium 55 of the optical device 50. In the example of FIG. 1, three types of coherent light beams are incident on the scanning device 65 from the laser sources 61r 61g and 61b. Therefore, the scanning device 65 changes the reflection angle of these coherent light beams with time to scan the n number of the groups of rectangular regions 56 in respective colors on the hologram recording medium 55.

In FIG. 9, coherent light beams from the laser sources 61r, 61g and 61b converge on one point on the scanning device 65. Therefore, the scanning device 65 may have a small refection surface area, and hence may have a light weight, with low power for rotation. Nevertheless, since coherent light beams from the three laser sources 61r, 61g and 61b converge on one point, an intense light beam is emitted to a specific point on the refection surface. Therefore, there is a durability problem in that the scanning device 65 suffers a shorter life. For avoiding such a problem, one technique is to diffuse coherent light beams to be emitted to the refection surface of the scanning device 65.

Figure 11:
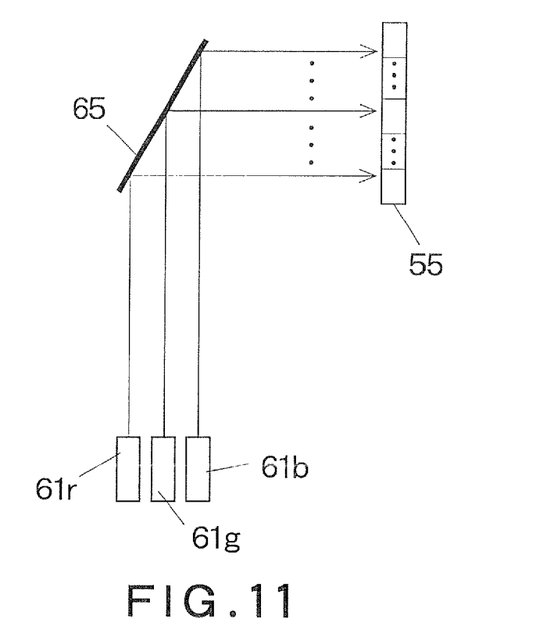
FIG. 11 is a view showing an example in which coherent light beams emitted from laser sources 61r, 61g and 61b are incident on a scanning device 65, as parallel beams, and coherent light beams reflected by the scanning device 65 are incident on the hologram recording medium 55, as divergent light beams.

FIG. 11 is a view showing an example in which coherent light beams emitted from the laser sources 61r, 61g and 61b are incident on the scanning device 65, as parallel beams, and coherent light beams reflected by the scanning device 65 are incident on the hologram recording medium 55, as divergent light beams.

In the example of FIG. 11, coherent light beams from the laser sources 61r, 61g and 61b are incident on three locations on the scanning device 65, and a coherent light beam is reflected from each location toward the hologram recording medium 55.

Figure 12:
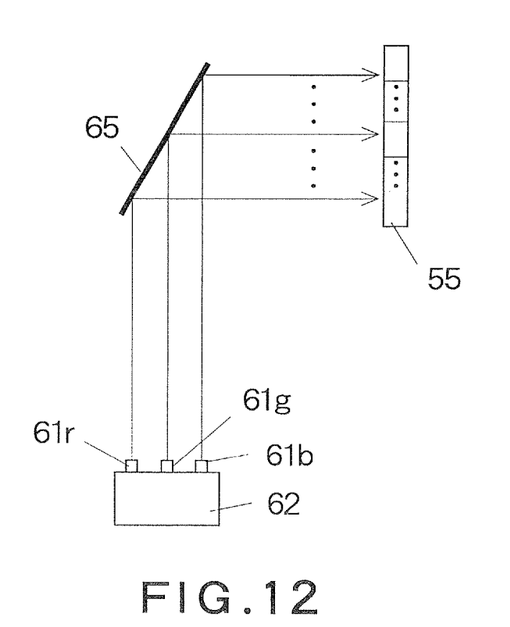
FIG. 12 is a view showing an example of using a one-chip laser array 62 with built-in 3-color laser sources 61r, 61g and 61b.

FIG. 12 is a view showing an example in which a one-chip laser array 62 with built-in 3-color laser sources 61r, 61g and 61b is used as an optical source. Also in the example of FIG. 12, the hologram recording medium 55 shown in FIG. 1 is used and the projection apparatus 20 has the same configuration as that of FIG. 1.

The laser sources 61r, 61g and 61b in the laser array 62 emit coherent light beams in parallel directions. Therefore, a condenser lens may be provided as a convergent optical system to make the coherent light beams converge on the same point as shown in FIG. 9.

In the apparatus of FIG. 12, the positioning of the laser sources 61r, 61g and 61b is simplified by using the laser array 62, with less variation in optical path among the devices.

[Structure of Hologram Recording Medium 55]

Figure 13:
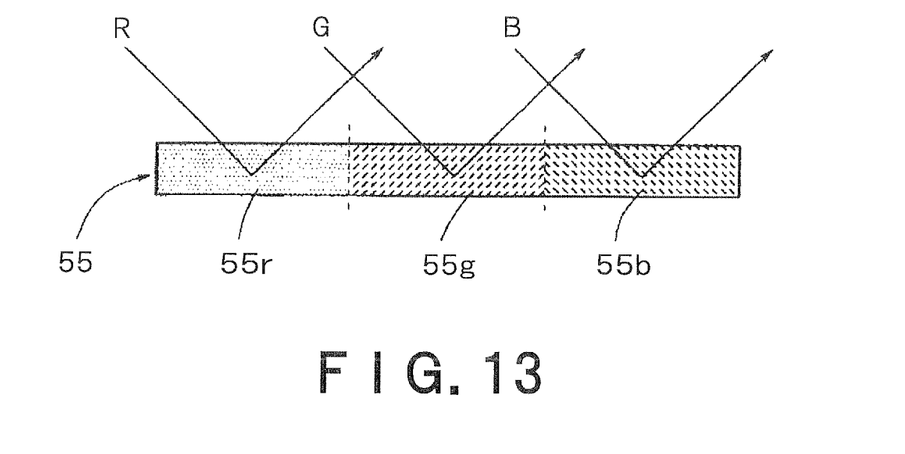
FIG. 13 is a view showing an example of a hologram recording medium 55 having interference fringes corresponding to respective colors, which are recorded in the plane direction by multiple recording.

The hologram recording medium 55 explained with reference to FIG. 10 and other drawings has the n number of the regions 56 for the respective colors of the laser sources 61r, 61g and 61b. In each of the n number of the regions 56 for the respective colors, as shown in FIG. 13, reference fringes corresponding to each color are recorded in the plane direction by multiple recording. In this case, it is required to adjust the film thickness and the amount of refractive index modulation Δn of the hologram recording medium 55 so that, at a designed incidence angle of a coherent light beam of one color, the diffraction condition of a coherent light beam of another color, i.e. wavelength range, does not influence the diffraction condition of the coherent light beam, namely, wavenumber spectra of the coherent light beams when diffracted do not interfere with each other.

In FIG. 13, each of the recording regions 55r, 55g and 55b corresponding the respective colors is divided into the n number of regions.

FIG. 13 shows an example of multiple recording to a reflection-type hologram recording medium 55. However, as shown in FIG. 1 and the other drawings, a transmission-type hologram recording medium 55 may be used.

Figure 14:
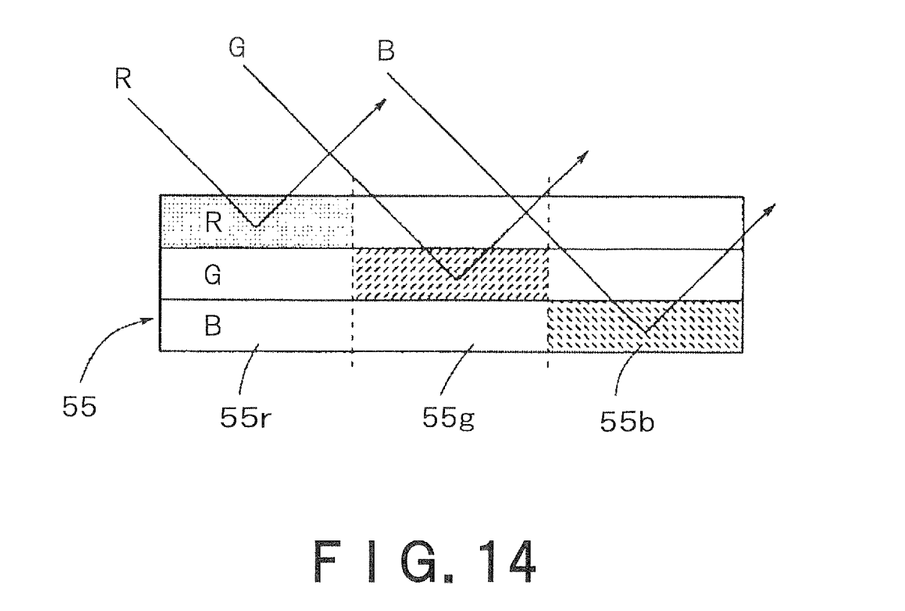
FIG. 14 is a view showing a hologram recording medium 55 formed in a layered structure for diffracting a specific color in each layer.

As shown in FIG. 14, the hologram recording medium 55 may be formed in a layered structure for diffracting a specific color in each layer. In the example of FIG. 14, from the top to bottom, a layer 55r for red, a layer 55g for green and a layer 55b for blue are stacked. Each layer is formed with an interference fringe for coherent light beams in respective wavelengths for respective colors to interfere with each other. Also, in FIG. 14, each of the layers 55r, 55g and 55b is divided into the n number of regions.

In the example of FIG. 14, like shown in FIG. 13, together with the layers 55r, 55g and 55b, the hologram recording medium 55 is divided into three recording regions in the plane direction. Practically, only the regions indicated with slant lines are used for reproducing an image of a scattering plate. Therefore, in order to form an interference fringe in each layer, the interference fringe is formed in the region indicated with the slant lines. Moreover, instead of dividing into the three recording regions in the plane direction as shown in FIG. 14, an interference fringe may be formed in the entire region in each layer for reproduction of an image of a scattering plate.

[Reflection- and Transmission-Type Hologram Recording Media 55]

The reflection-type hologram recording medium 55, hereinafter, "a reflection-type hologram", has higher wavelength selectivity than the transmission-type hologram recording medium 55, hereinafter, "a transmission-type hologram". In other words, in a reflection-type hologram, although interference fringes corresponding to different wavelengths are superimposed one another in layers, a coherent light beam having a desired wavelength can be diffracted by a desired layer only. In addition, the reflection-type hologram is excellent in that the influence of zero-order light can be easily removed.

On the other hand, although a transmission-type hologram has a wide spectrum range for diffraction and a high acceptable level to the laser sources 61, if interference fringes corresponding to different wavelengths are superimposed one another in layers, layers other than a desired layer also diffract coherent light of a desired wavelength. Therefore, in general, it is difficult to configure the transmission-type hologram in a layered structure.

[Avoidance of Zero-Order Light]

Part of coherent light beams from the irradiation unit 60 is not diffracted by the hologram recording medium 55 but passes through it. This type of light is called zero-order light. When zero-order light is incident on the illumination zone LZ, an abnormal region, i.e. a spotted region, a line region, and a plane region, inevitably appears in which brightness, i.e. intensity, is rapidly increased compared with the surroundings.

When the reflection-type hologram recording medium 55 is used, the spatial light modulator 30 and the projection optical system 20 are not arranged in a propagation direction of zero-order light, hence it is relatively easy to avoid zero-order light. However, when the transmission-type hologram recording medium 55 such as shown in FIG. 1 and the other drawings is used, it is highly likely that the spatial light modulator 30 and the projection optical system 20 are arranged in a propagation direction of zero-order light, hence care must be taken.

For example, in the configuration of FIG. 1, since the optical path of coherent light beams reflected by the scanning device 65 changes, zero-order light may pass through the spatial light modulator 30 and the projection optical system 20. For this reason, in the case where the configuration of FIG. 1 is employed, it is required to design the location of the scanning device 65, the spatial light modulator 30, and the projection optical system 20 so as to be arranged in accordance with the propagation path of zero-order light so that the zero-order light does not pass through the spatial light modulator 30 and the projection optical system 20.

(Optical Device 50)

In the embodiment described above, although the example in which the optical device 50 is configured with a reflection-type volume hologram recording medium 55 using photopolymer has been described, the present invention is not limited thereto. As already explained, the optical device 50 may include a plurality of hologram recording media 55. Moreover, the optical device 50 may include a volume hologram recording medium that is a type in which recording is performed by using a photosensitive medium including a silver halide material. Moreover, the optical device 50 may include a transmission-type volume hologram recording medium 55 or a relief-type, i.e. emboss-type hologram recording medium 55.

With respect to the relief-type, i.e. emboss-type, hologram recording medium, a hologram interference fringe is recorded using a convex-concave structure of the surface thereof. However, in the case of the relief-type hologram recording medium, scattering due to the convex-concave structure of the surface may also cause generation of new speckles, hence in this respect, the volume hologram recording medium is preferable. In the case of the volume hologram recording medium, a hologram interference fringe is recorded as a refractive index modulation pattern, i.e. refractive index distribution, of an inner portion of the medium, hence there is no influence of scattering because of the convex-concave structure of the surface.

However, even when the volume hologram recording medium is used, a type in which recording is performed using a photosensitive medium including a silver halide material may become a cause of generating new speckles due to scattering of silver halide particles. In this respect, the volume hologram recording medium using a photopolymer is preferable as the hologram recording medium 55.

Moreover, in the exposure process shown in FIG. 7, although a so-called Fresnel-type hologram recording medium 55 is produced, a Fourier transform-type hologram recording medium 55 which can be obtained through recording using lenses may be produced. When the Fourier transform-type hologram recording medium 55 is used, lenses can also be used for image reproduction.

In addition, a striped pattern, i.e. refractive index modulation pattern or convex-concave pattern, which is to be formed on the hologram recording medium 55 may be designed by using a computer based on a planned wavelength or incidence direction of a reproduction illumination light beam La, a shape or position of an image to be reproduced, and the like, without use of an actual object light beam Lo and reference light beam Lr. The hologram recording medium 55 obtained in this manner is called a computer generated hologram recording medium. Moreover, when a plurality of coherent light beams having mutually different wavelength ranges are emitted from the irradiation unit 60 in a similar manner in the modification described above, the hologram recording medium 55 as a computer generated hologram recording medium may be partitioned two-dimensionally into a plurality of regions provided corresponding to coherent light beams of respective wavelength ranges so that the coherent light beams of the respective wavelength ranges are diffracted in the corresponding regions to reproduce images.

Moreover, in the embodiments described above, although the example is described in which the optical device 50 includes the hologram recording medium 55 by which coherent light beams emitted to respective positions thereof are spread to illuminate the entire region of the illumination region LZ, the present invention is not limited thereto. Instead of the hologram recording medium 55 or in addition to the hologram recording medium 55, the optical device 50 may include a lens array as an optical device by which the propagation directions of coherent light beams incident on respective positions thereof are changed and the coherent light beams are diffused to illuminate the entire region of the illumination region LZ. As a concrete example of the lens array, a total reflection-type or refraction-type Fresnel screen having a diffusing function, a fly-eye lens, and the like may be exemplified. In this type of irradiation unit 60, the irradiation unit 60 and the optical device 50 may be configured so that the irradiation unit 60 emits coherent light beams to the optical device 50 so that the coherent light beams scan the lens array and the coherent light beams incident on respective positions of the optical device 50 from the irradiation unit 60 undergo change in the propagation directions by the lens array to illuminate the illumination region LZ, thus effectively making speckles inconspicuous.

In more concretely, in the case of the present embodiment, it is required to provide a lens array that includes at least three lenses corresponding to the laser sources 61*r*, 61*g* and 61*b*, respectively. On each lens, a coherent light beam is incident that is emitted from the corresponding laser source 61 and then reflected by the scanning device 65. Then, through each lens, an incident light beam is diffused to illuminate the entire region of the illumination zone LZ. With this configuration, even if the hologram recording medium 55 is not provided, the entire region of the illumination zone LZ can be illuminated with a color, for example, white.

The present invention is not limited to the embodiments described above but includes various modifications conceivable by those skilled in the art. The effects of the present invention are also not limited to those described above. Namely, various additions, modifications and partial omissions may be made without departing from the conceptual idea and gist of present invention derived from those defined in the accompanying claims and their equivalents.

The invention claimed is:

1. A stereoscopic image display apparatus comprising:
an optical device that comprises a diffusing surface, the diffusing surface having an n (n being an integer of 2 or more) number of regions provided corresponding to the n number of parallax images, respectively, each region being capable of diffusing an incident coherent light beam;
an irradiation unit to irradiate the optical device with a coherent light beam to repeatedly and sequentially scan the n number of the regions with the coherent light beam;
a spatial light modulator that is illuminated with a coherent light beam incident on each of positions of the optical device and then diffused, to generate a modulated image corresponding to a scanning region among the n number of the regions; and a projection optical system to project the n number of the parallax images generated by the modulated image onto one plane so that the parallax images are superimposed on one another on the one plane at different angles.

2. The stereoscopic image display apparatus of claim 1, wherein the projection optical system comprises a diffusing member that is disposed on the one plane to diffuse a coherent light beam corresponding to the modulated image.

3. The stereoscopic image display apparatus of claim 2, wherein diffusion characteristics of the diffusing member are different between one direction and another direction.

4. The stereoscopic image display apparatus of claim 3, wherein the diffusing member has different diffusion characteristics in a direction perpendicular to a horizontal direction in which horizontally adjacent pixels of a stereoscopic image viewable on the one plane are aligned, than in the horizontal direction.

5. The stereoscopic image display apparatus of claim 1 further comprising a condensing optical system that converges the n number of the parallax images generated from the modulated image onto respective regions of an optical component disposed on the projection optical system.

6. The stereoscopic image display apparatus of claim 1, wherein the optical device is a hologram recording medium, the n number of the regions being n number of rectangular regions each extending in one direction of the hologram recording medium and having an interference fringe formed therein for diffracting a coherent light beam.

7. The stereoscopic image display apparatus of claim 6, wherein the n number of the rectangular regions are arranged so that a longitudinal direction of each rectangular region is perpendicular to a horizontal direction of the diffusing surface.

8. The stereoscopic image display apparatus of claim 6, wherein the n number of the rectangular regions are arranged so that neighboring rectangular regions are contacted.

9. The stereoscopic image display apparatus of claim 6, wherein the irradiation unit sequentially scans the n number of the rectangular regions with a coherent light beam in a longitudinal direction of each rectangular region; and
while the irradiation unit is scanning one of the rectangular regions with a coherent light beam, the spatial light modulator continuously generates a modulated image corresponding to the one rectangular region.

10. The stereoscopic image display apparatus of claim 1 further comprising a position detector that detects a viewer's position, wherein the irradiation unit scans only part of the n number of the regions with a coherent light beam so that a parallax image is viewed at the viewer's position detected by the position detector.

11. The stereoscopic image display apparatus of claim 10, wherein the position detector detects a viewer's view direction.

12. The stereoscopic image display apparatus of claim 1, wherein the irradiation unit comprises:
a light source to emit a coherent light beam; and
a scanning device to adjust a reflection angle of the coherent light beam emitted from the light source and to scan the optical device with a reflected coherent light beam.

13. The stereoscopic image display apparatus of claim 12, wherein the light source comprises a plurality of light sources that emit a plurality of coherent light beams having different wavelength ranges, the n number of the regions of the optical device being scanned with coherent light beams from the respective light sources that correspond to the n number of the regions.

* * * * *